US012782922B2

(12) United States Patent
Aramaki et al.

(10) Patent No.: US 12,782,922 B2
(45) Date of Patent: Nov. 3, 2026

(54) SEMICONDUCTOR DEVICE MANUFACTURING SYSTEM

(71) Applicant: HITACHI HIGH-TECH CORPORATION, Tokyo (JP)

(72) Inventors: Tooru Aramaki, Tokyo (JP); Xicen Zhang, Tokyo (JP); Yuki Kashiwagi, Tokyo (JP); Joji Kono, Tokyo (JP); Takefumi Kakinuma, Tokyo (JP); Masataka Okayama, Tokyo (JP); Go Saito, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 18/692,077

(22) PCT Filed: Mar. 13, 2023

(86) PCT No.: PCT/JP2023/009572
§ 371 (c)(1),
(2) Date: Mar. 14, 2024

(87) PCT Pub. No.: WO2024/189731
PCT Pub. Date: Sep. 19, 2024

(65) Prior Publication Data
US 2026/0153857 A1 Jun. 4, 2026

(51) Int. Cl.
*G05B 19/418* (2006.01)
*H04L 9/40* (2022.01)

(52) U.S. Cl.
CPC .... *G05B 19/41835* (2013.01); *H04L 63/0281* (2013.01); *H04L 63/10* (2013.01); *H04L 63/123* (2013.01); *G05B 2219/45031* (2013.01)

(58) Field of Classification Search
CPC ... H04L 63/0281; H04L 63/10; H04L 63/123; G05B 19/41835; G05B 2219/45031
See application file for complete search history.

(56) References Cited

U.S. PATENT DOCUMENTS

2003/0208448 A1 11/2003 Perry et al.
2003/0220768 A1 11/2003 Perry et al.
(Continued)

FOREIGN PATENT DOCUMENTS

JP 2005-023540 A 8/2005
JP 2005-250993 A 9/2005
(Continued)

OTHER PUBLICATIONS

Office Action mailed Sep. 2, 2024 in Taiwanese Application No. 113103722.
(Continued)

*Primary Examiner* — Chau Le
(74) *Attorney, Agent, or Firm* — Miles & Stockbridge, P.C.

(57) ABSTRACT

A semiconductor device manufacturing system including a platform connected to a semiconductor manufacturing device via a network, and the semiconductor device manufacturing system further includes: a database server in which a device ID assigned to each of the semiconductor manufacturing devices and extension of data output from each of the semiconductor manufacturing devices are stored as a device master; a conversion connection device in which the data is acquired by accessing the device master based on authentication information of the network or authentication information of the platform; and a path setting device in which spontaneous data output from the semiconductor manufacturing device is blocked.

14 Claims, 10 Drawing Sheets

(56) References Cited

U.S. PATENT DOCUMENTS

| | | | | |
|---|---|---|---|---|
| 2003/0229805 | A1 | 12/2003 | Perry | |
| 2006/0064440 | A1 | 3/2006 | Perry | |
| 2009/0054089 | A1 | 2/2009 | Tsurukiri et al. | |
| 2009/0292388 | A1* | 11/2009 | Iimori | G05B 19/41865 700/121 |
| 2017/0075332 | A1* | 3/2017 | Norman | G06F 9/5027 |
| 2020/0041976 | A1 | 2/2020 | Nishi | |
| 2020/0302468 | A1* | 9/2020 | Karuppan | H04L 63/12 |
| 2022/0276639 | A1* | 9/2022 | Brain | G05B 19/4184 |
| 2023/0066892 | A1* | 3/2023 | Liu | G06N 20/00 |

FOREIGN PATENT DOCUMENTS

| | | | |
|---|---|---|---|
| JP | 2006-318292 | A | 11/2006 |
| JP | 2020-021214 | | 2/2020 |
| TW | 202308350 | A | 2/2023 |

OTHER PUBLICATIONS

Search Report mailed May 30, 2023 in International Application No. PCT/JP2023/009572.
Written Opinion mailed May 30, 2023 in International Application No. PCT/JP2023/009572.

* cited by examiner

[FIG. 1]
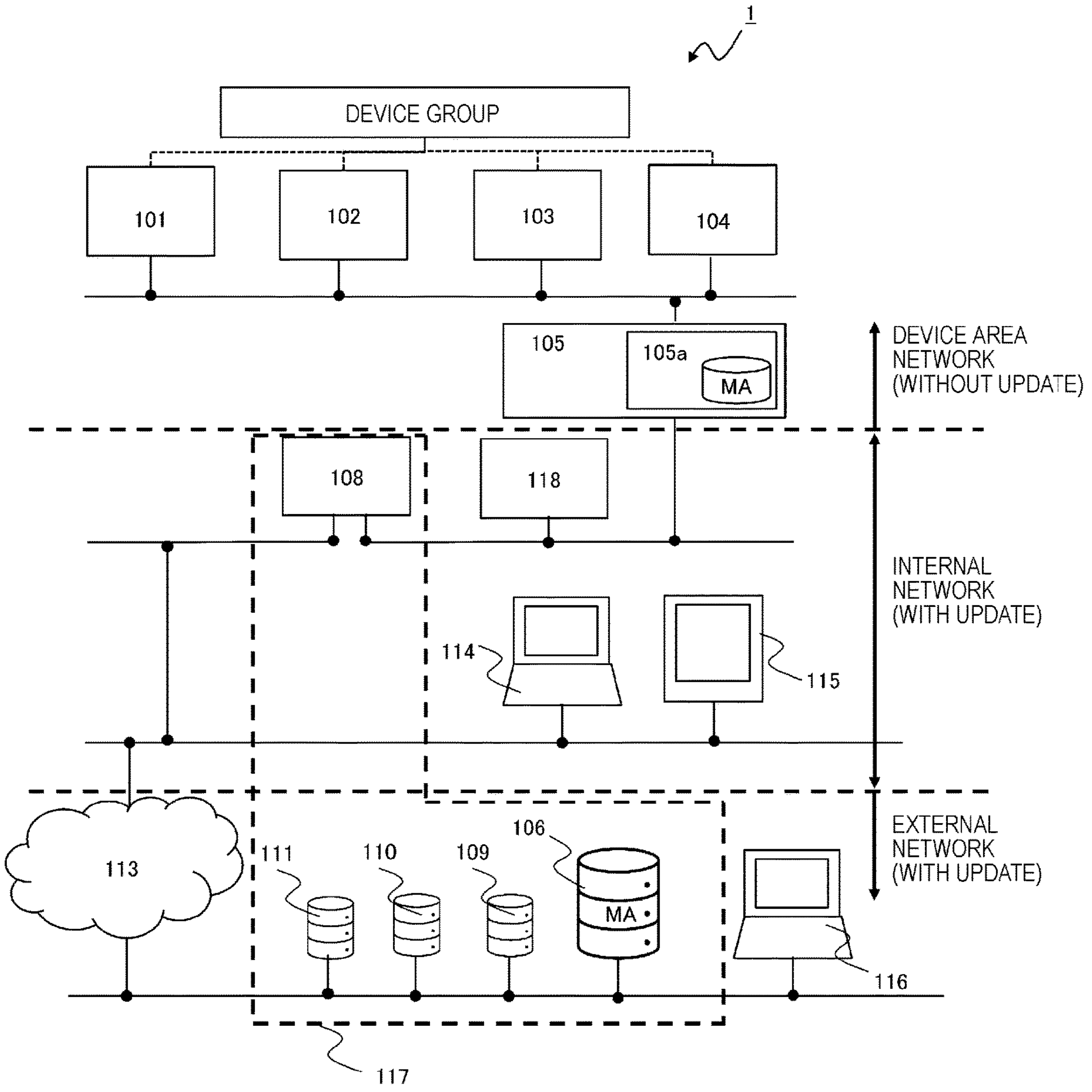

[FIG. 2]
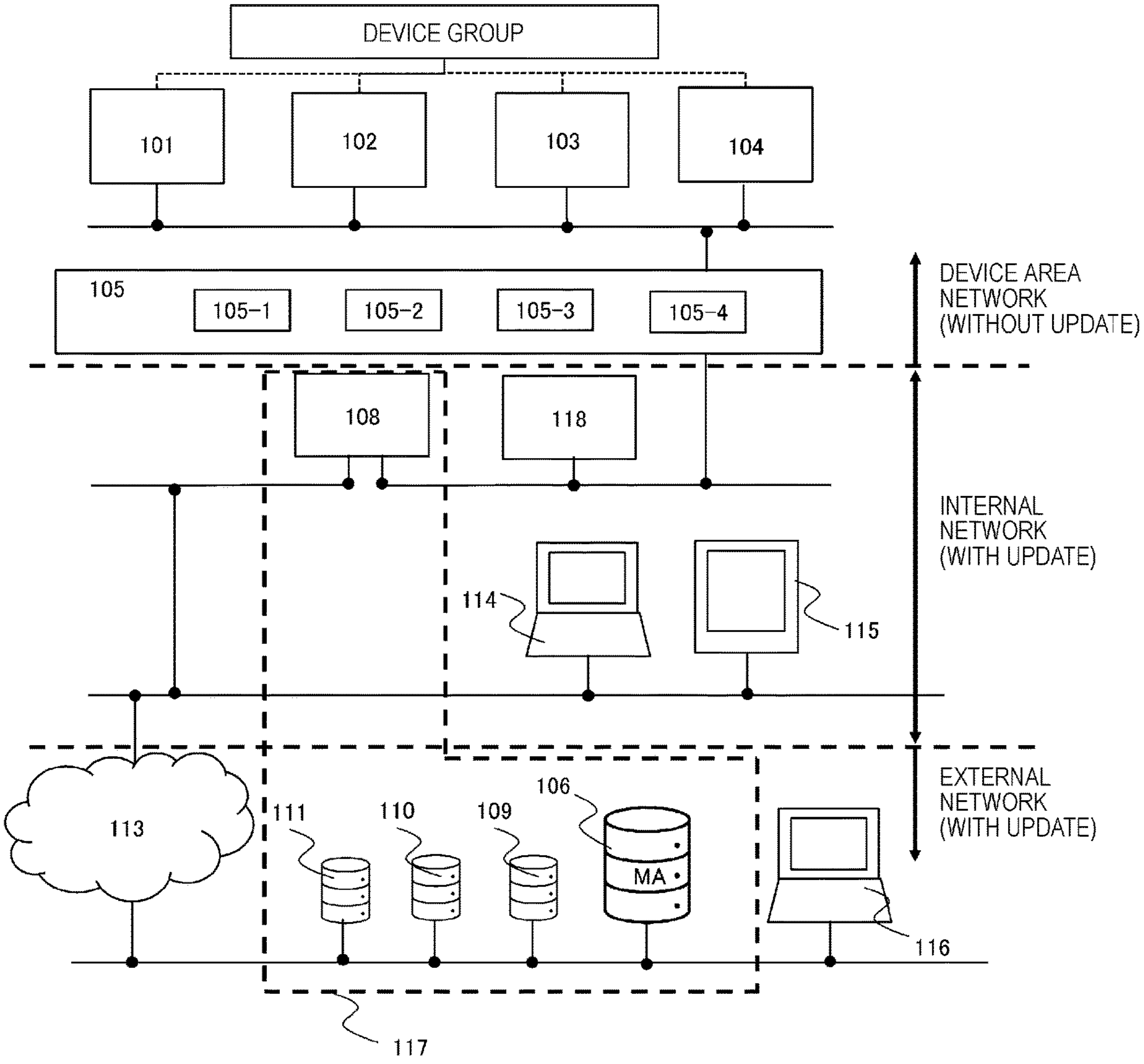

[FIG. 3]
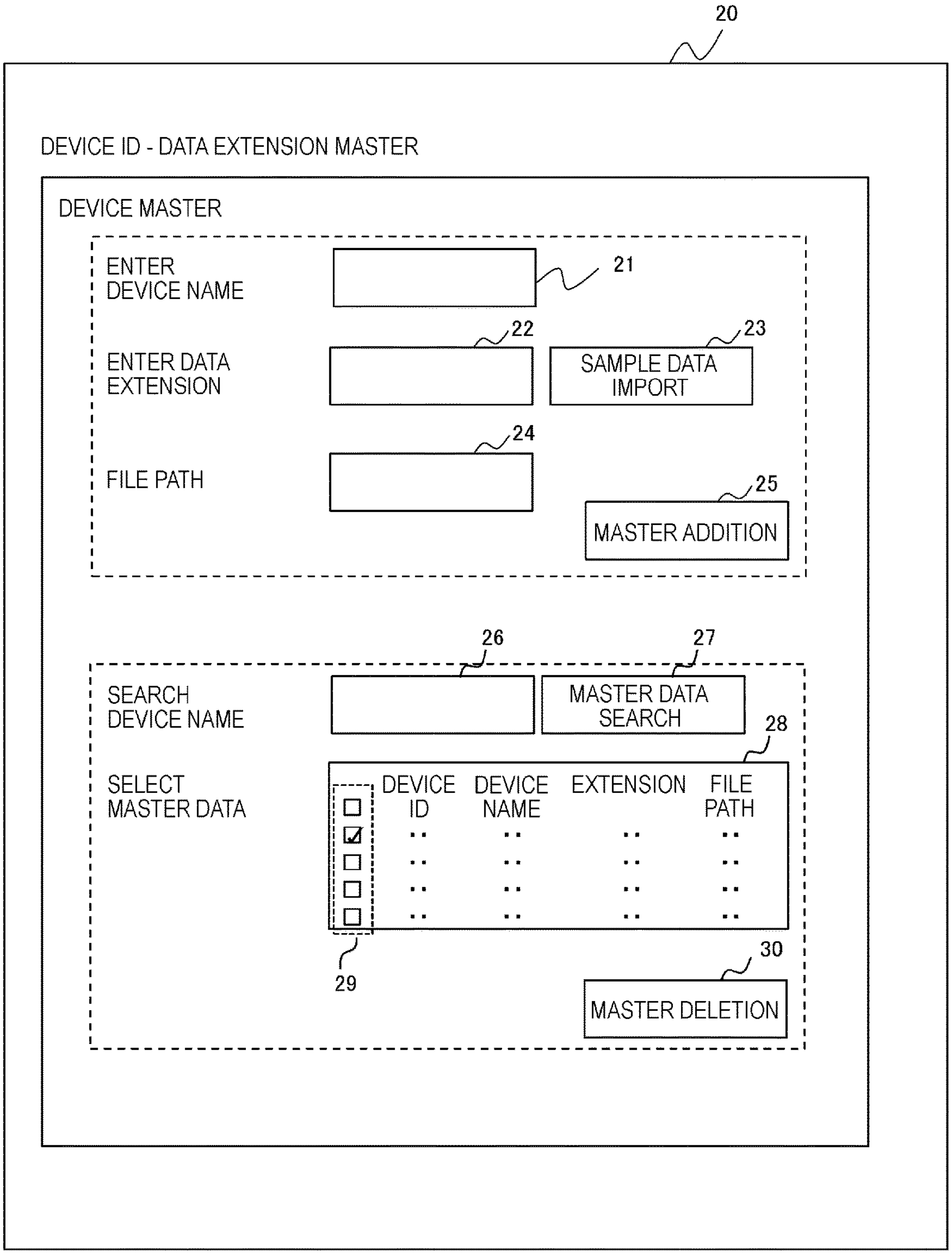

[FIG. 4]
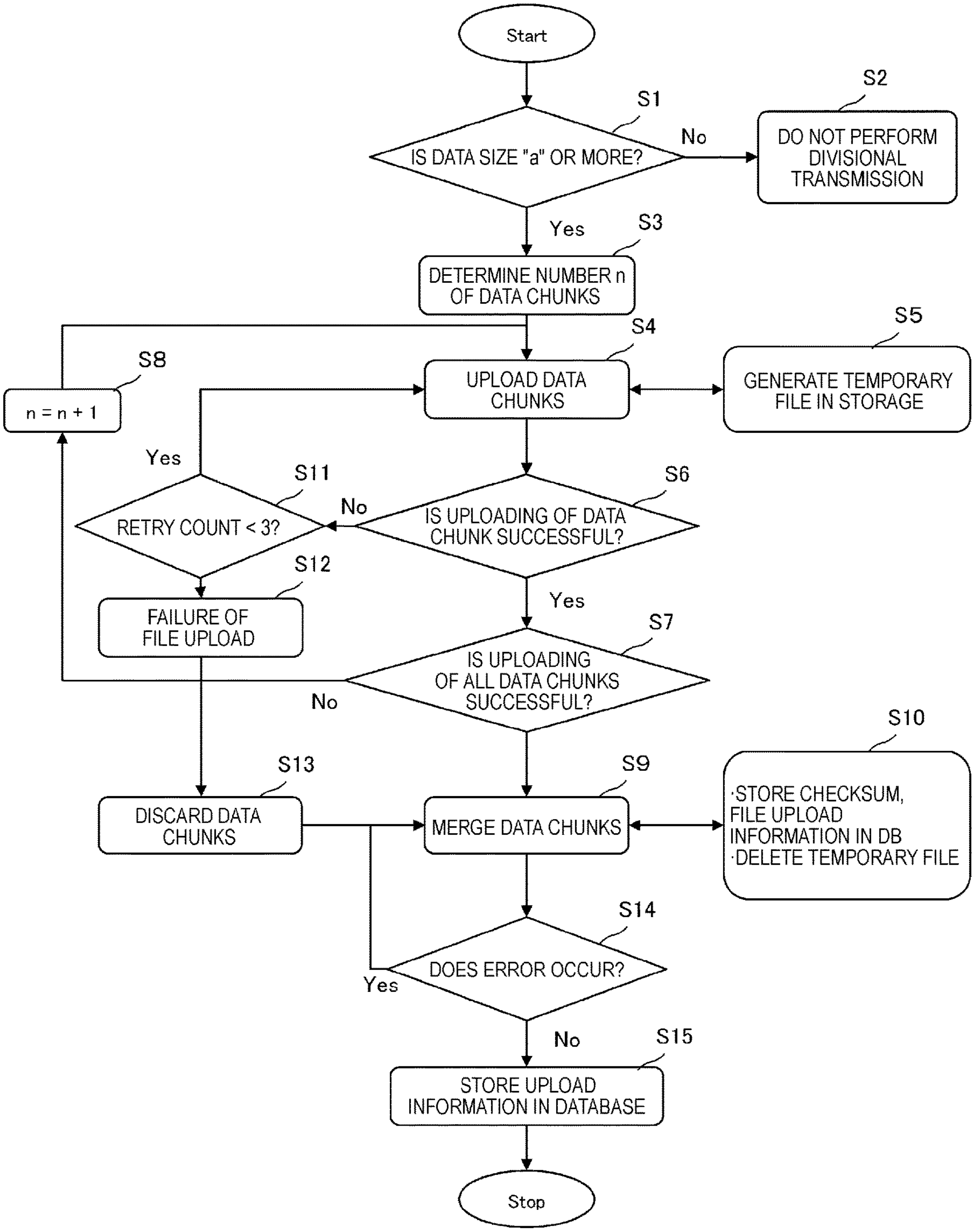

[FIG. 5]
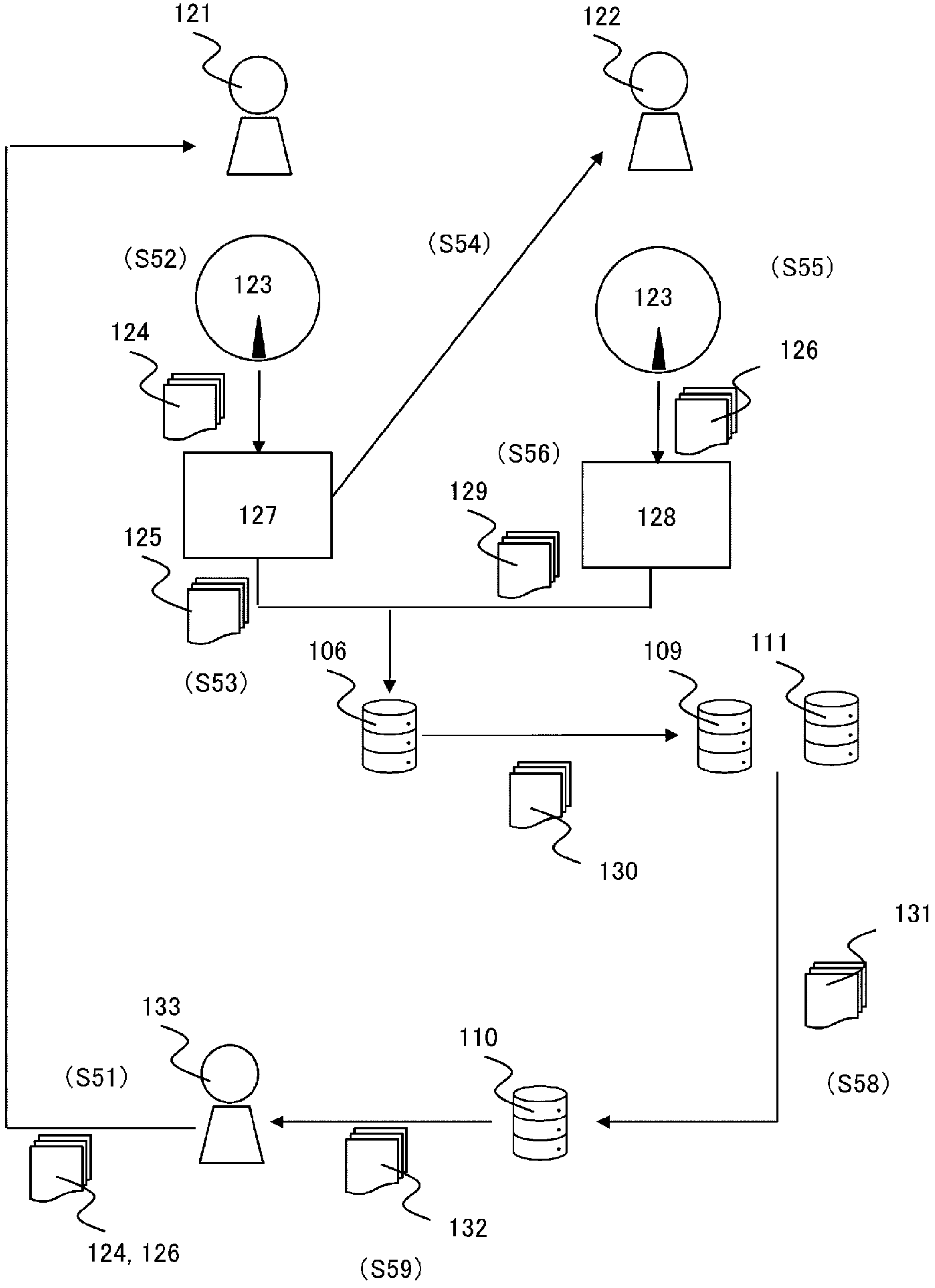

[FIG. 6]
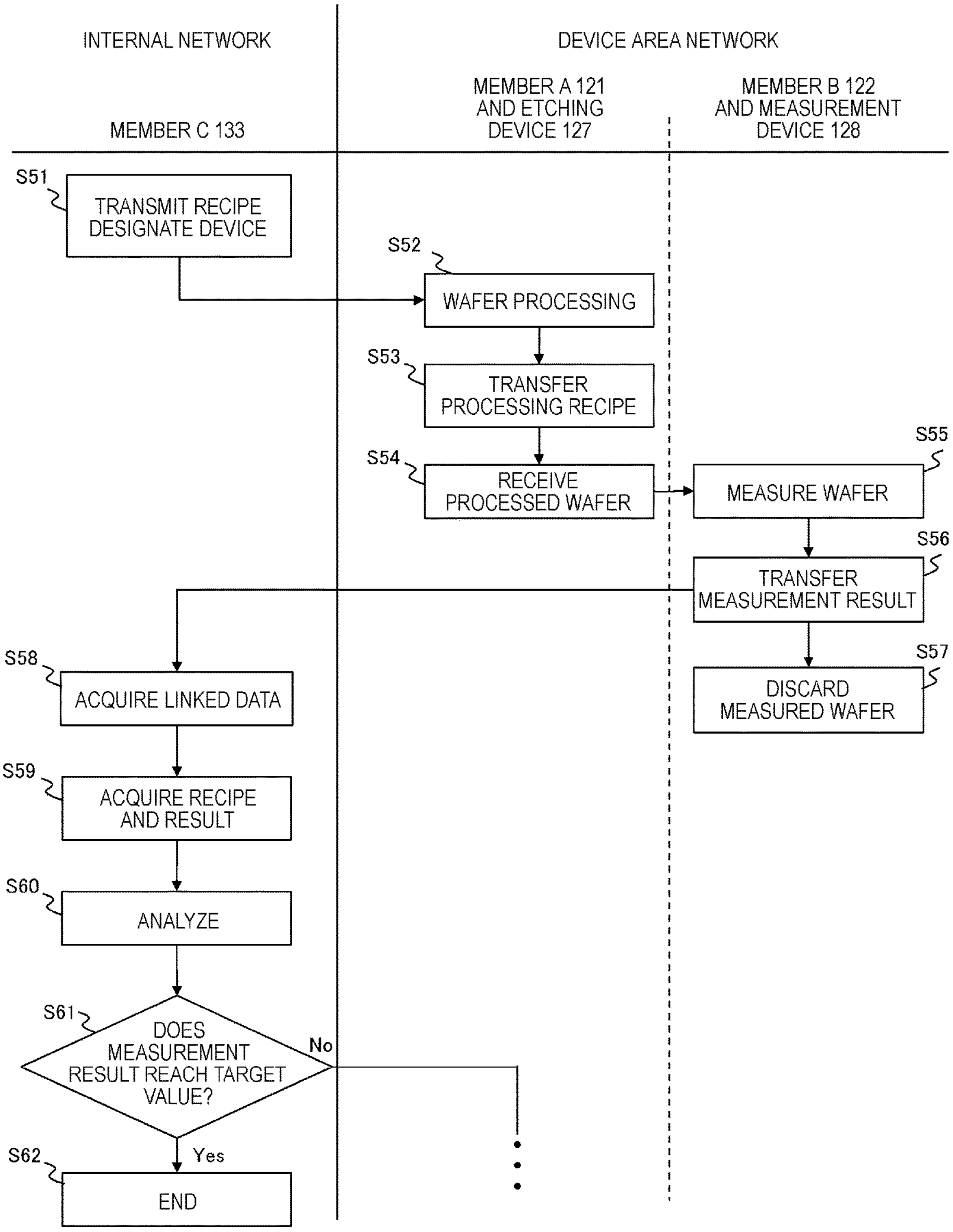

[FIG. 7]
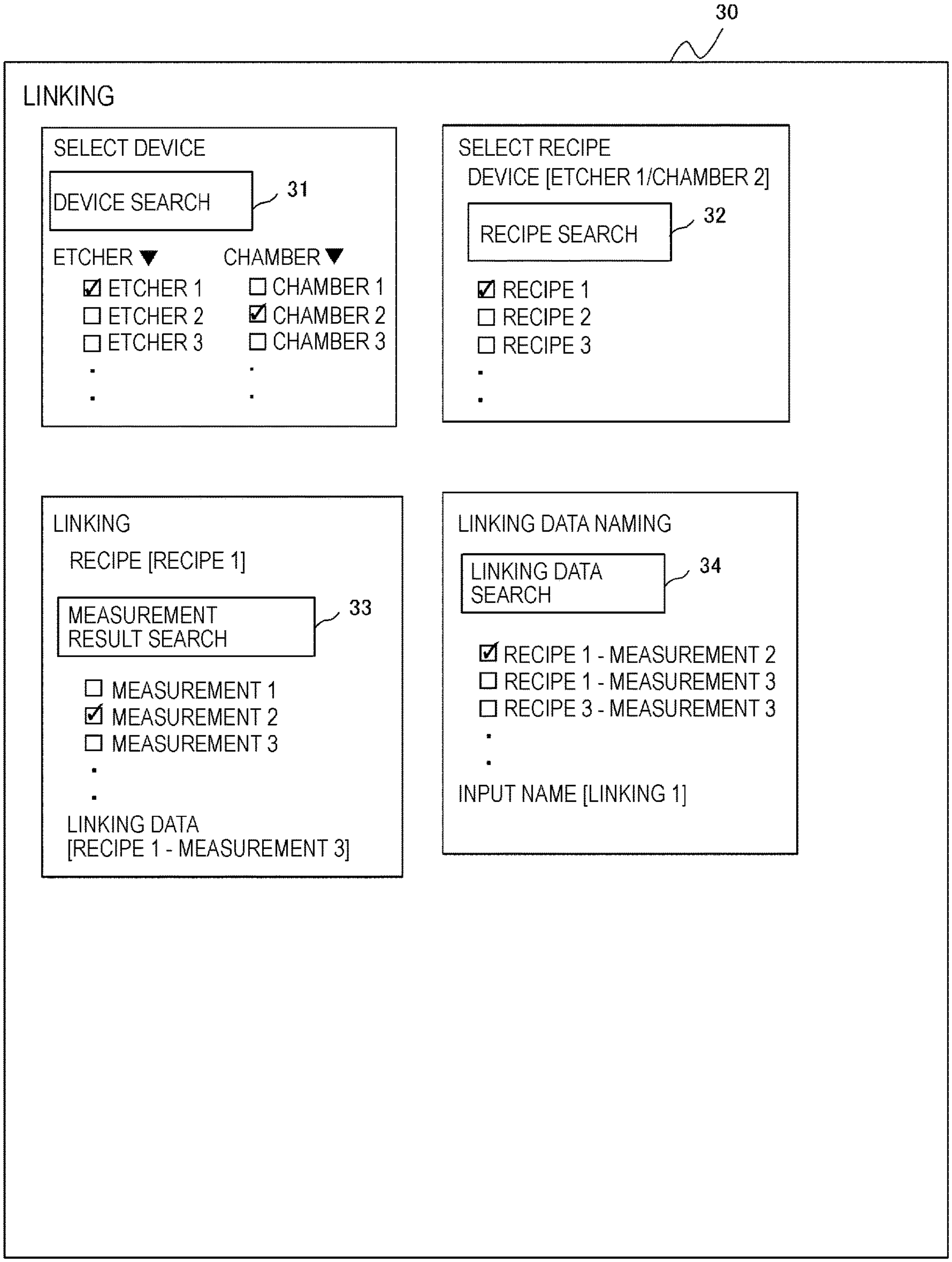

[FIG. 8]
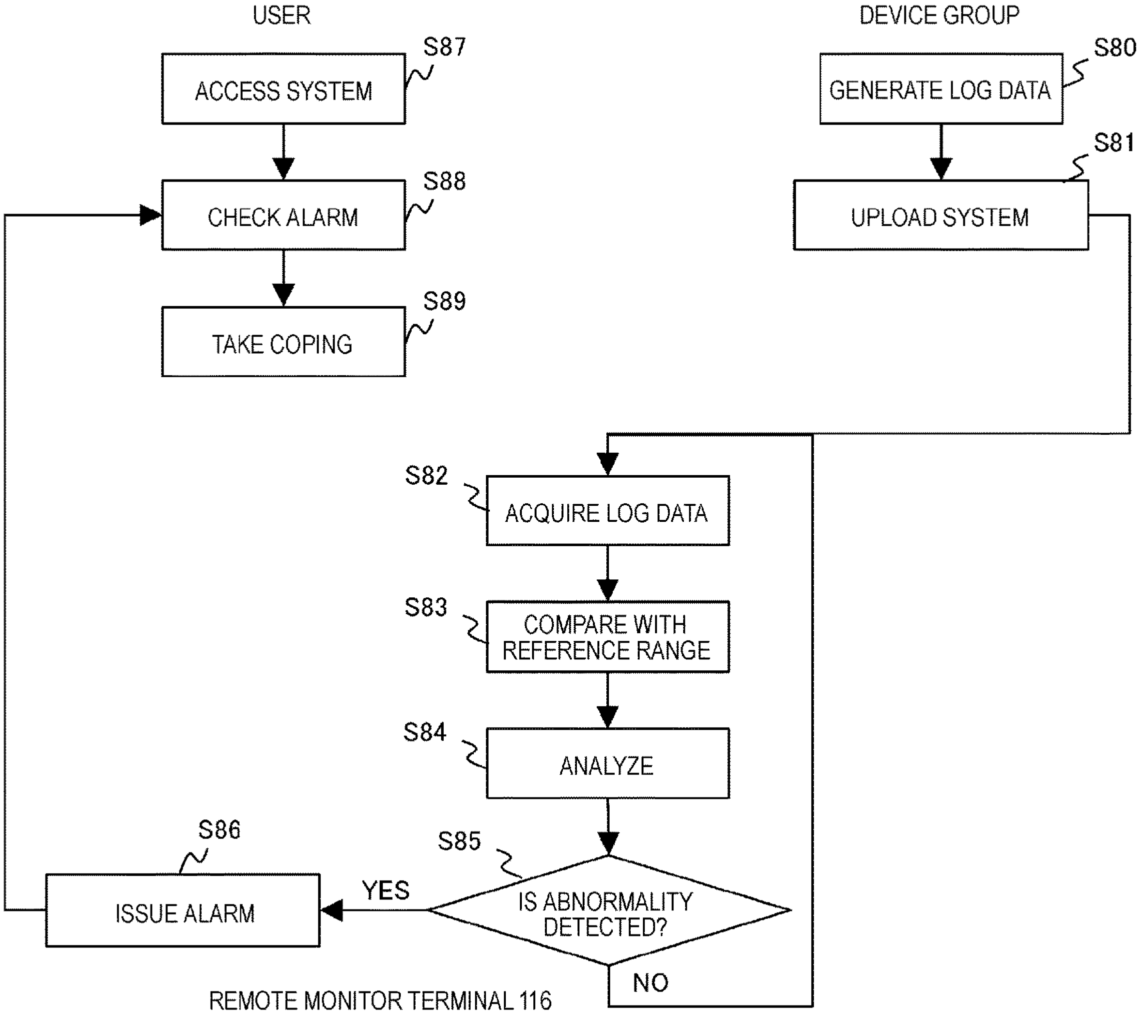

[FIG. 9]
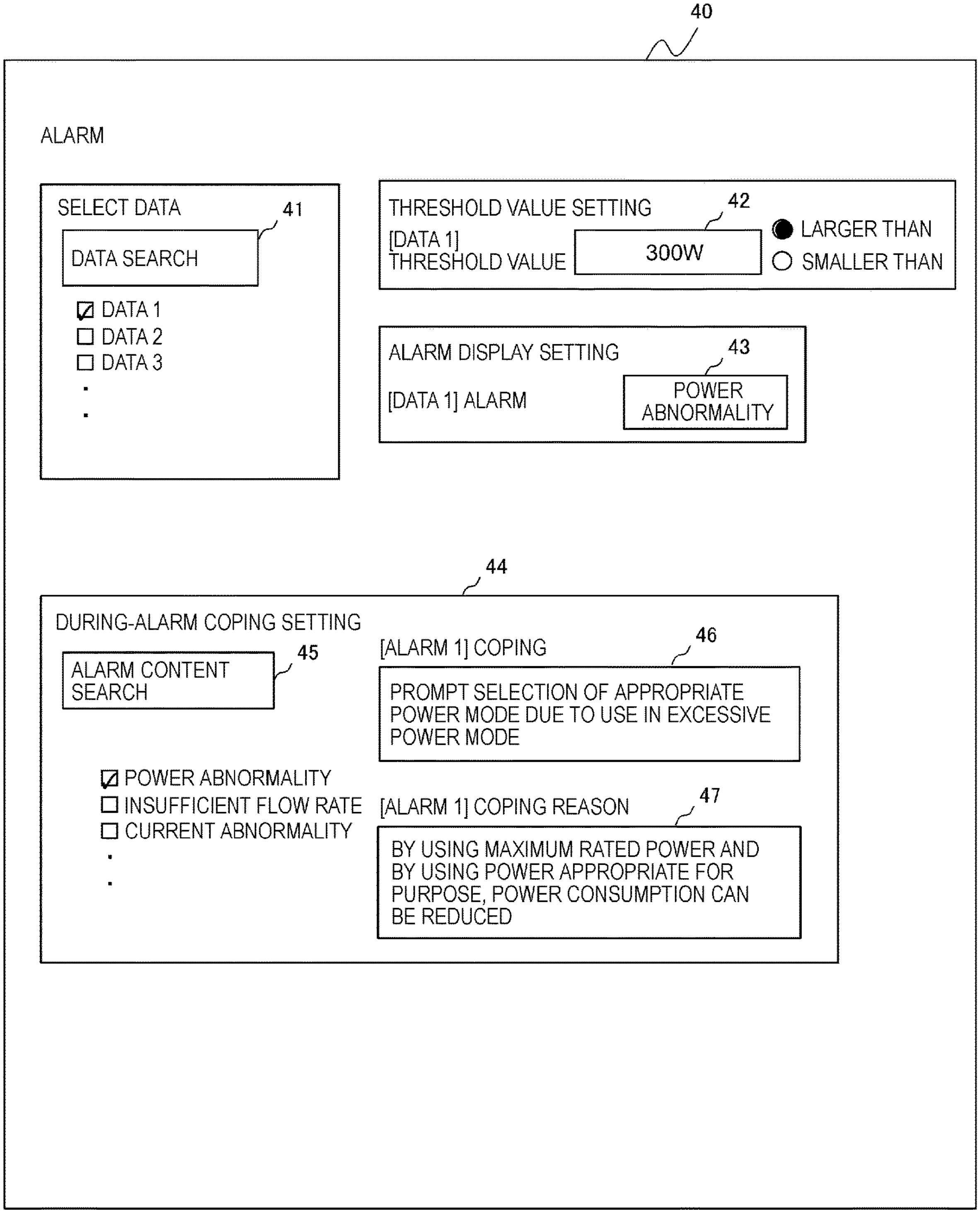

[FIG. 10]
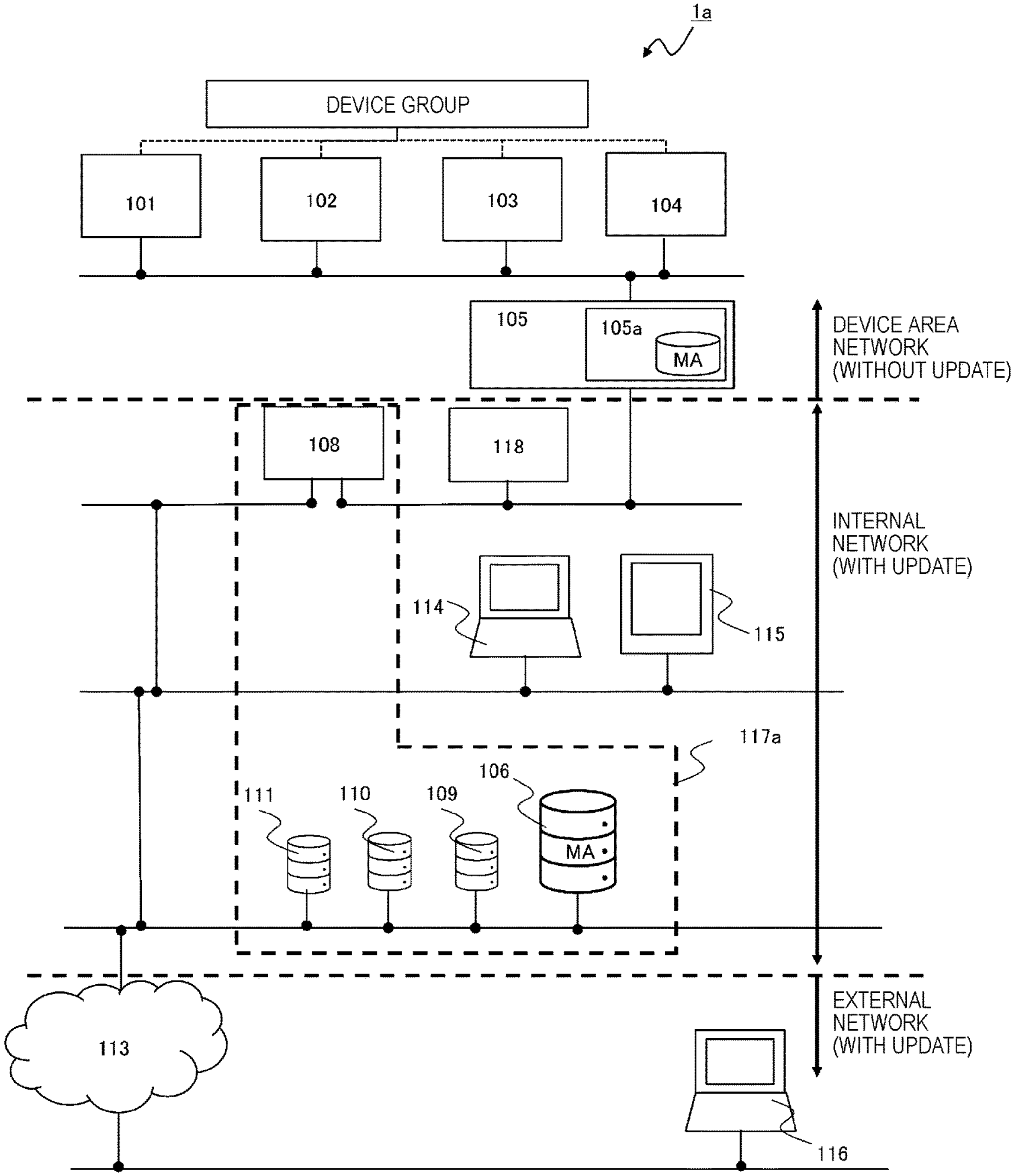

SEMICONDUCTOR DEVICE MANUFACTURING SYSTEM

TECHNICAL FIELD

The present invention relates to a semiconductor device manufacturing system.

BACKGROUND ART

A device group including a semiconductor manufacturing device is in an environment where OS updates cannot be performed via an external network, so that security processing before data reception cannot often be performed. In addition, since it is not known what kind of data will be transmitted from other devices, there is a high security risk. For this reason, those who provide the semiconductor manufacturing device need to provide a system on the premise that the OS of the semiconductor manufacturing device will not be updated.

As illustrated in PTL 1, as the related art, there are communication terminals and integrated circuits including a data parsing unit that extracts identification information of a counterparty terminal and determines a verification operation according extracted identification information and a data verification unit that executes the verification operation, to be able to ensure a safety of data from a transmission source in a counterparty environment. PTL 1 discloses the following points. "Provided are communication terminals, secure devices, and integrated circuits that can ensure a safety of data against threats such as computer viruses operating improperly for corresponding to various platforms, by performing security processing in the environment of the counterparty terminal that may use data before the data is transmitted at a transmitting-side communication terminal. When a mobile phone 101 transmits data, a data parsing unit 113 extracts identification information of a counterparty terminal 103 written in the transmitted data, refers to a permitted information database 114, Selects a predetermined verification operation according to an environment of the counterparty terminal 103, performs the security processing selected in a data verification unit 116, and notifies the counterparty terminal 103 of the transmitted data together with security processing information".

CITATION LIST

Patent Literature

PTL 1: JP2006-318292A

SUMMARY OF INVENTION

Technical Problem

However, the technique disclosed in PTL 1 is a technique corresponding to known data within a transmission source terminal. For this reason, PTL 1 does not consider dealing with data output from a device group that has a high security risk and includes a semiconductor manufacturing device of which OS is not updated.

In addition, since data related to the semiconductor manufacturing includes images measured by using electron beams and is often large in size, there is a problem that it takes time to upload and download the data.

Therefore, an object of the present invention is to provide a technique capable of dealing with data output from a device with a high security risk, such as a device group including a semiconductor manufacturing device, and thus, capable of handling a large amount of data.

Solution to Problem

In order to solve the above-described problems, one of semiconductor device manufacturing systems according to the present invention is a semiconductor device manufacturing system including a platform connected to a semiconductor manufacturing device via a network, and the semiconductor device manufacturing system further includes: a database server in which a device ID assigned to each of the semiconductor manufacturing devices and extension of data output from each of the semiconductor manufacturing devices are stored as a device master; a conversion connection device in which the data is acquired by accessing the device master based on authentication information of the network or authentication information of the platform; and a path setting device in which spontaneous data output from the semiconductor manufacturing device is blocked.

Advantageous Effects of Invention

According to the present invention, it is possible to deal with data output from a device with a high security risk, such as a device group including a semiconductor manufacturing device, and thus, it is possible to handle a large amount of data.

Problems, configurations, and effects other than those described above will be made clear by the description of the following embodiments.

BRIEF DESCRIPTION OF DRAWINGS

FIG. 1 is a diagram illustrating a configuration of a semiconductor device manufacturing system using a platform and a device group including a semiconductor manufacturing device.

FIG. 2 is a diagram illustrating a modified example of a system according to a first embodiment.

FIG. 3 is a diagram illustrating a GUI (Graphical User Interface) shown to a user when operating a device master MA.

FIG. 4 is a diagram illustrating an example of a process of uploading data from a gateway PC to a database server.

FIG. 5 is a diagram schematically illustrating an example of a data analysis flow from data generation when an etching process is performed by a plurality of users.

FIG. 6 is a diagram illustrating the schematic diagram of FIG. 5 as a flowchart.

FIG. 7 is a diagram illustrating a GUI of a WEB application for performing data linking.

FIG. 8 is a diagram schematically illustrating a process of abnormality detection or failure detection.

FIG. 9 is a diagram illustrating a GUI of a WEB application for setting an alarm.

FIG. 10 is a diagram illustrating a configuration of a semiconductor device manufacturing system using a platform and a device group including a semiconductor manufacturing device.

DESCRIPTION OF EMBODIMENTS

Embodiments of the present invention will be described below with reference to the drawings. It is noted that the invention is not limited to these embodiments. In addition, in the description of the drawings, the same portions are denoted by the same reference numerals.

When there are a plurality of components having the same or similar functions, the same reference numerals may be provided with different subscripts in the description. Furthermore, when there is no need to distinguish between the plurality of components, the subscripts may be omitted in the description.

It is noted that, in the present disclosure, "recipe" refers to a processing program defining processing procedures and control parameters for processing performed in the device.

First Embodiment

Configuration of System

First embodiment of the present invention will be described below with reference to FIG. 1. FIG. 1 is a diagram illustrating a configuration of a semiconductor device manufacturing system 1 using a platform 117 and a device group including a semiconductor manufacturing device.

A semiconductor device manufacturing system 1 is a semiconductor device manufacturing system including a platform connected to a semiconductor manufacturing device via a network, and further includes: a database server in which a device ID assigned to each of the semiconductor manufacturing devices and extension of data output from each of the semiconductor manufacturing devices are stored as a device master; a conversion connection device in which the data is acquired by accessing the device master based on authentication information of the network or authentication information of the platform; and a path setting device in which spontaneous data output from the semiconductor manufacturing device is blocked. In addition, the database server is disposed on the platform and connected to the conversion connection device via the Internet.

Further, the semiconductor device manufacturing system 1 integrates data related to an important device in semiconductor device manufacturing, and makes it possible to parse data for evaluating processes in semiconductor manufacturing and maintaining and managing the semiconductor manufacturing device. In FIG. 1, the environment to which the platform 117 is applied is classified into three areas of a device area network, an internal network, and an external network.

The device area network is a network that connects a control device 101 for the semiconductor manufacturing device (hereinafter referred to as a "semiconductor manufacturing device PC"), a control device 102 for a semiconductor inspection device (hereinafter referred to as a "semiconductor inspection device PC"), a control device 103 for a semiconductor parsing device (hereinafter referred to as a "semiconductor parsing device PC"), a control device 104 for a semiconductor analysis device (hereinafter referred to as a "semiconductor analysis device PC"), and a relay device 105 (hereinafter referred to as a "relay PC").

It is noted that the semiconductor manufacturing device PC 101, the semiconductor inspection device PC 102, the semiconductor parsing device PC 103, and the semiconductor analysis device PC 104 are also simply referred to as "device PCs 101 to 104". In addition, the semiconductor devices controlled by the device PCs are also simply referred to as a "device group".

The internal network is a network that connects a conversion connection device 108 (hereinafter referred to as a "gateway PC"), a user computer 114, a user mobile terminal computer 115, and a path setting device 118 (hereinafter referred to as a "path design PC").

The external network is a network that connects a database server 106, an application server 109, a WEB server 110, a GPU server 111, and a remote monitoring computer 116. The internal network and the external network are connected by the Internet 113. It is noted that the database server 106, the application server 109, the WEB server 110, and the GPU server 111 are also simply referred to as "server groups 106 and 109 to 111".

The platform 117 includes the application server 109, the GPU server 111, and the WEB server 110, and the application server 109 or the GPU server 111 is connected to the WEB server 110 via a communication means. The platform 117 enables remote access to the device PCs 101 to 104 in the device area network from the user computer 114 and the user mobile terminal computer 115 in the internal network or the remote monitoring computer 116 in the external network. The platform 117 includes a network between the device group including the semiconductor manufacturing device and the relay PC 105 performing security checks, a network between the gateway PC 108 having a data acquisition program and the data path setting PC 118, and a network between various databases.

It is noted that a configuration of the platform 117 is an example, and is not limited to this configuration. For example, the platform may include the application server 109 and the GPU server 111, and as described later, and may have a configuration in which data output from each of the semiconductor manufacturing devices can be downloaded by the application server 109 or the GPU server 111.

Classification Based on Security Measures

Different security measures are taken for each area of the device area network, the internal network, and the external network.

The device area network is a network to which at least the semiconductor manufacturing device is connected. The device area network is, for example, a network configured by a manufacturing device and the like configuring a production line in a semiconductor manufacturing factory. The device area network may include, for example, a network of devices automatically carrying parts and finished products and devices automatically loading and unloading the parts.

The internal network is, for example, a network to which the server for performing production management is connected. In addition to managing production plans, for example, a server and the like for monitoring production status and acquiring facility information is also connected to the internal network. A server for collecting information for receiving and placing an order for the parts and formulating production plans may be connected. The internal network may include, for example, a managing department of headquarters.

The external network is a network connected to the device area network and the internal network via the Internet. The external network is a network that is not managed by a semiconductor factory or headquarters, and includes, for example, remote maintenance connection by a device vendor.

The security measures will be described. The security measures such as preventing intrusion into a communication network, preventing unauthorized persons from entering the area, managing accounts, monitoring communication logs and operation logs, and monitoring alerts for PCs and terminals are set for each of the three areas. For example, in the device area network, the security measures including a network configured with devices in the semiconductor manufacturing factory include preventing unauthorized persons from entering the premises and restricting the user of the terminal devices such as PCs.

Herein, in the present disclosure, among the security measures, software updates (particularly OS updates) are focused. From the OS updates, effects of eliminating vulnerabilities and preventing unauthorized access from outside are expected. Although the OS is updated on the internal network and the external network, there are cases where devices or units of which OS is not updated exist on the device area network.

Configuration for Each Area

In the first embodiment, a device related to an etching process among the semiconductor manufacturing devices will be described as an example.

Device Area Network

The semiconductor manufacturing device PC 101 is a device that manages control of, for example, a wet etching device, a plasma etching device, and the like. The semiconductor inspection device PC 102 is a device that controls, for example, a visual inspection device such as a camera or a microscope, and an electrical inspection device using a probe. The semiconductor parsing device PC 103 is a device that controls a parsing device such as a transmission electron microscope or an atomic force microscope. For example, the semiconductor analysis device PC 104 is a device that controls an analysis device performing, for example, TCT gas chromatograph/mass spectrometry and time-of-flight secondary ion mass spectrometry. Although the control devices are classified according to the functions of inspection, parsing, and analysis, the classification is not limited thereto. A single control device may perform a plurality of the functions, and the functions may be appropriately set based on the manufacturing process performed by the semiconductor manufacturing device to which the platform 117 is applied.

When a process recipe for performing the etching process is input to the semiconductor manufacturing device PC 101, the semiconductor manufacturing device PC 101 executes the process recipe. An instruction value according to contents of the process recipe is transmitted from the semiconductor manufacturing device PC 101 to each unit in the etching device, and the etching process is performed in the etching device. The executed process recipe is stored in the semiconductor manufacturing device PC 101.

The etched wafer is carried to any one of the semiconductor inspection device, the semiconductor parsing device, and the semiconductor analysis device. When the semiconductor inspection device PC 102 receives a measurement recipe for inspection, the semiconductor inspection device PC 102 controls the semiconductor inspection device according to the measurement recipe. A measurement result is stored in the semiconductor inspection device PC 102. Similarly, the semiconductor parsing device PC 103 receives a measurement recipe for parsing, and controls the semiconductor parsing device according to the measurement recipe. A measurement result is stored in the semiconductor parsing device PC 103. The semiconductor analysis device PC 104 receives a measurement recipe for analysis and controls the semiconductor analysis device according to the measurement recipe. A measurement result is stored in the semiconductor analysis device PC 104.

Data Communication Between Areas

Referring back to FIG. 1, the description of the first embodiment of the invention will be made. The relay PC 105 network-connected to each device group is disposed in the device area network in which the device group including the semiconductor manufacturing device such as the etching device is disposed. The relay PC 105 has a means for bidirectionally communicating data between the control device of each device in the device group and the relay PC 105, and has a storage unit that stores a program for executing security checks on data and the data passing the security check. Specifically, the relay PC 105 includes a communication means so that the relay PC 105 can collect data obtained from the device group or the device PCs 101 to 104. The relay PC 105 has a storage unit that stores data indicating the result received from the device group, master data to be described later, and the like, and has access rights limited to only the relay PC 105. For example, the folder in which the result of each device group is stored is generated as a shared folder 105*a* by using SMB (Server Message Block) communication which is the communication protocol, and access rights are granted to the relay PC 105. Accordingly, the relay PC 105 can collect output data output from each device in the device group. Further, the relay PC 105 can also convey (transmit) the data to the device group. For example, the relay PC 105 receives the recipe from the gateway PC 108 and inputs the recipe to each device in the device group. It is noted that, although the shared folder 105*a* is illustrated as an example, the form of the storage unit is not limited thereto. A storage device within the relay PC 105 may be used, or an external storage device such as a hard disk that is separate from the relay PC 105 and connectable to the relay PC 105 may be used.

The relay PC 105 is capable of updating the OS via the external network. In addition, the relay PC 105 also has a built-in program that can execute security checks on data such as virus software, and the latest virus definition is always reflected. A monitor destination that is always monitored for security in the virus software is used as the shared folder 105*a*, and the data stored in the shared folder is constantly checked for security. Only this shared folder can be accessed from the internal network and the external network, and is also used as a storage location for the data such as recipes to be transferred to the device group.

The shared folder 105*a* manages the device master MA including at least the device ID assigned to each device in the device group and the extension of the output data that is data output from each device in the device group. The device master MA is also stored in the database server 106 in the external network, and the extensions include extensions indicating text formats such as txt, csv, and tsv and extensions indicating image formats such as jpg, png, and gif.

It is noted that, although the example in which there is one shared folder is illustrated, there may be a plurality of the shared folders. For example, the folder in which data to be extracted and used on the external network is stored in the device PCs 101 to 104 is generated as the shared folder between the relay PC 105 and each of the device PCs 101 to 104, by using, for example, the SMB protocol. FIG. 2 is a diagram illustrating a modified example of the system according to the first embodiment. Herein, shared folders 105-1 to 105-4 are generated in the relay PC 105. Information transmitted and received between the semiconductor manufacturing device PC 101 and the relay PC 105 is recorded in the shared folder 105-1. Information transmitted and received between the semiconductor inspection device PC 102 and the relay PC 105 is recorded in the shared folder 105-2. Information transmitted and received between the semiconductor parsing device PC 103 and the relay PC 105 is recorded in the shared folder 105-3. Information transmitted and received between the semiconductor analysis device PC 104 and the relay PC 105 is recorded in the shared folder 105-4.

Further, although the device master MA is stored in the database server 106, the device master MA may be stored in another server included in the external network.

Internal Network

The internal network is formed outside the relay PC 105. The gateway PC 108 is disposed within the internal network. The gateway PC 108 has a built-in program that accesses the device master MA based on the authentication information of the external network or the authentication information of the platform and acquires the output data permitted by the device master MA from the storage unit, and executes the program. Specifically, the gateway PC 108 can access the shared folder 105*a* via the relay PC 105, and can collect the output data on the device group based on the device master MA by referring to the device master MA.

The data path setting PC 118 has a built-in program that allows the gateway PC 108 to access the storage unit and convey the acquired output data to the internal network or the output data stored in the storage unit to the device group and blocks spontaneous data leakage from each device in the device group.

Accordingly, the gateway PC 108 can access the storage unit of the relay PC 105, but is prohibited from conveying data from the device area network side to the internal network.

Further, the user computer 114 and the user mobile terminal computer 115 are operated by the user who uses the platform 117. The semiconductor device manufacturing system 1 is connected to the platform 117, the user computer 114, and the user mobile terminal computer 115 via a communication means.

External Network

The database server 106 stores the device master MA and authentication information of the user. Further, the database server 106 stores data output from each of the semiconductor manufacturing devices. The database server 106 stores the output data output from each device in the device group (for example, data indicating results acquired by the device group and manufacturing data output from each device in the device group).

The application server 109 receives user data conveyed from the WEB server 110, executes the application program, and responds to the WEB server 110. Further, when data search and data update are necessary, the request is made to the database server 106, and the dynamic content response is made to the WEB server 110 after processing the data.

The WEB server 110 responds to the user request with static Web contents (HTML pages, files, images, videos, and the like), and when dynamic processing is required, the WEB server 110 requests the application server 109 to perform processing and receives the same dynamic content response from the application server 109.

The database server 106 performs processing according to the request from the application server 109 and conveys the result to the application server 109.

When there is a heavy load among the user requests, instead of the application server 109, the GPU server 111 generates the content.

The server groups 106 and 109 to 111 will be described. A communication means is provided between at least one of the application server 109 and the GPU server 111, and the WEB server. At least one of the application server 109 and the GPU server 111 can download the output data output from the device group.

Method of Operations

The user registers the authentication information in order to log in the platform 117 from the user computer 114 or the user mobile terminal computer 115. The authentication information of the user is stored in the database server 106. When the user ID and the password are input from the user computer 114 or the user mobile terminal computer 115, the user is authenticated on the database server 106. It is noted that, when logging in the platform 117, the database server 106, the application server 109, the WEB server 110, and the GPU server 111 are applied.

(Addition and Deletion of Master Data in Device Master MA)

The user logs in the platform 117 based on the authentication information and registers the device master MA in the platform 117. The example of registering in the device master MA after logging in the platform 117 will be described by using FIG. 3. FIG. 3 is a diagram illustrating a GUI (Graphical User Interface) shown to the user when operating the device master MA. A GUI 20 is generated by the application server 109 or the WEB server 110 and displayed on the user computer 114 or the user mobile terminal computer 115.

First, the user enters the device name from which data is to be imported into a blank field 21 of "enter device name" in the GUI 20, and enters the extension of the data to be imported into a blank field 22 of "enter data extension". For example, when the extension is ".txt" for the text file, enter "txt". Alternatively, by pressing a "sample data import" button 23 and importing sample data obtained from an actual device, the extension is recognized on the database server 106 side. Further, the location where the data designated by the device name and the data extension is stored is displayed in a "file path" field 24. By pressing a "master addition" button, the device ID and the data extension of the device from which data is to be acquired are registered in the device master MA. The registered master data is searched by entering the device name in a blank field 26 of "search device name", and pressing a "master data search" button 27 in the figure. Since the search results are displayed in a "select master data" display 28, a selection box 29 for unnecessary master data from the displayed master data is checked, and the data is deleted by pressing a "master deletion" button 30.

The master data is registered in the device master MA with such GUI operations. However, this is not the only registration method, for example, the method of directly registering the master data in the database server 106 may be used. The method of registering in the device master MA can be selected from among various methods as appropriate. Further, although FIG. 3 is an example of the GUI of the application used in the platform 117, the display items and operation method of the GUI are not limited to those described here. Alternatively, the application of the platform 117 may be skipped in order to register in the device master MA.

Method of Acquiring Data

The gateway PC 108 performs HTTP communication with the WEB server 110 and requests access to the device master MA. The WEB server 110 acquires the device ID, the file path, and the data extension recorded in the device master MA from the database server 106, and conveys the device ID, the file path, and the data extension to the gateway PC 108. The gateway PC 108 accesses the shared folder 105*a* of the relay PC 105 according to the acquired file path information, and acquires data specified by the device ID and the data extension. The acquired data is temporarily stored in the gateway PC 108, and then stored in the database server 106 by executing the program in the WEB server 110. After uploading, the temporarily stored data is deleted so that no data remains in the gateway PC 108. Although the above description is made by using HTTP communication as an example, the communication method is not limited thereto.

It is noted that the data path setting PC 118 executes a built-in program that blocks spontaneous data leakage from the device group. In other words, the data path setting PC 118 enables data communication in the direction from the device group or the relay PC 105 toward the gateway PC 108 when the gateway PC 108 acquires data from the device group. On the other hand, when report data communication is made from the device group or the relay PC 105 toward the internal network, the data path setting PC 118 blocks the data communication.

Accordingly, the user can handle the data on the semiconductor manufacturing device and the semiconductor inspection/measurement device included in the device group via the external network. Further, since only data extensions registered in the device master MA are handled, predetermined data on each device group can be handled without a security risk.

Modified Example of Gateway PC 108

A modified example of the gateway PC 108 will be described. When a transfer error occurs when uploading from the gateway PC 108 to the database server 106, a program that re-transfers only the specific data chunk where the error occurs is built in the gateway PC 108. Accordingly, the transfer error can be avoided.

Furthermore, since the data file has a large amount and cannot be transferred at once depending on the specifications of the gateway PC 108, a program that divides the data into a plurality of data chunks and transfers the programs is built in the gateway PC 108. Accordingly, the transfer of a large amount of data can be implemented.

Furthermore, when transferring one file, in the case of dividing the one file into the plurality of data chunks, the program needs to be integrated in the process of storing the data in the database server 106, and thus, the program to be integrated and a program that compares the data before integration with the data after integration to determine whether there is any data loss are built in the gateway PC 108. Accordingly, avoidance of the data loss by checking data consistency can be implemented. In addition, a program that limits a data transfer capacity per unit time and uses a batch processing method as a data transfer method is built-in. Accordingly, a load when transferring a large amount of data can be distributed.

FIG. 4 is a diagram illustrating an example of a process of uploading data from the gateway PC 108 to the database server 106.

First, in step S1, the gateway PC 108 determines whether a size of data to be uploaded to the database server 106 is a predetermined value "a" or more. The predetermined value "a" is a value determined according to the addition of data communication. When the data size is less than "a" (No in step S1), the data can be uploaded at once. For this reason, the gateway PC 108 uploads the data without performing a data divisional transmission (step S2).

In step S3, the gateway PC 108 determines the number of data chunks, which is a unit of data to be uploaded. The data output from each of the semiconductor manufacturing devices is divided into the plurality of data chunks. The gateway PC 108 divides the data into the plurality of data chunks according to the determined number.

In step S4, the gateway PC 108 uploads the data chunks (step S4). When uploading, the gateway PC 108 generates a temporary file in a storage of the gateway PC 108 (step S5). After finishing uploading, the temporary file is deleted.

The uploading of the data chunks is successful (step S6), and the uploading of the n divided data chunks is repeated (step S8). The database server 106 integrates the data chunks into one data file, compares the data file during transmission with the data file after completion of transmission, and verifies the data file during transmission and the data file after completion of transmission. Specifically, when all data chunks are uploaded (step S7), the database server 106 merges all the data chunks (step S9). As a data chunk merging process, a checksum and data file upload information are stored in the database server 106, and temporary files in the database server 106 are deleted. It is noted that each of the divided data chunks is conveyed in parallel. Herein, the data chunks are conveyed individually, but the data chunks can also be conveyed in parallel and simultaneously.

On the other hand, when the uploading of the data chunk is not successful (No in step S6), the uploading is retried (step S11). Herein, a retry count is set to less than three. When the file upload fails even after retrying twice (step S12), the data chunks are discarded (step S13), and the uploaded data chunks are merged (step S9).

When the error occurs in the data chunk merging process (Yes in step S14), the merging process is performed again (step S9). When the merging process is successful (No in step S14), information including the uploaded data is stored in the database server 106 (step S15).

It is noted that, although the example has been illustrated in which the data chunks in which the transfer error occurs are discarded, the specific data chunk in which the transfer error occurs can be re-conveyed.

(Modified Example of Platform 117)

A modified example of the platform 117 will be described. In the platform 117, a data folder transferred from the gateway PC 108 is monitored, the addition or change of the data file in the data folder is detected, the already transferred data file is not transferred, and a program that transfers the added or changed data file to the database server 106 is built in the platform 117. Accordingly, real-time transfer and double transfer can be avoided.

The user downloads the data stored in the database server 106 to the application server 109 or the GPU server 111 via HTTP communication and performs the data analysis, the data parsing, and the optimization of an etching recipe by using various applications. In order to utilize the program as a WEB application to improve user convenience, the WEB server 110 capable of performing HTTP communication with the application server 109 or the GPU server 111 is installed, and the program that can be used as the WEB application by the user via the WEB browser is built in the WEB server 110.

(Flow of Operations)

A data flow will be described in more detail with reference to FIGS. 5 and 6. FIG. 5 is a diagram schematically illustrating an example of a data analysis flow from data generation when the etching process is performed by a plurality of the users. FIG. 6 is a diagram illustrating the schematic diagram of FIG. 5 as a flowchart. A member A 121 and a member B 122 are located at locations where the device group and the device PCs 101 to 104 in the device area network can be operated. Further, a member C 133 operates the user computer 114 or the user mobile terminal computer 115 and uses the internal network.

The member C 133 plans to acquire information on the etching recipes from the remote location. Therefore, the member C 133 transmits the recipe through the platform 117 and designates the device for obtaining the measurement result (step S51). Specifically, the member C 133 transmits an etching recipe 124 to an etching device 127 and a measurement recipe 126 to a measurement device 128. Furthermore, the member C 133 designates the etching device 127, the data extension of the etching device 127, the measurement device 128, and the data extension of the measurement device 128.

The member A 121 performs the etching process on a wafer 123 by using the etching device 127 to which the etching recipe 124 is input (step S52). After wafer processing is performed, a used processing recipe 125 actually used for processing is stored in a shared folder of the relay PC 105. The used processing recipe 125 is transferred from the relay PC 105 to the database server 106 by the gateway PC 108 (step S53).

On the other hand, the processed wafer 123 is delivered to the member B 122 in order to measure the characteristics after processing (step S54). The member B 122 performs measurement of the wafer 123 by using the measurement device 128 into which the measurement recipe 126 is input (step S55). A measurement result 129, which is data after measurement, is stored in the shared folder of the relay PC 105, and then transferred to the database server 106 by the gateway PC 108 (step S56). Since the wafer 123 is used for examination, the measured wafer may be discarded (step S57).

The processing recipe 125 and the measurement result 129 transferred to the database server 106 are searched from the application server 109 or the GPU server 111 as set data 130, which is a set of data. After linking between the processing recipe 125 and the measurement result 129 in the application server 109 or the GPU server 111 is performed, the WEB server 110 acquires the linking result as linking data 131 (step S58). It is noted that the linking will be described later.

The WEB server 110 acquires the processing recipe 125 and the measurement result 129 (step S59), generates linking data 132 which is machine-readable data, and presents the linking data 132 to the member C 133. The member C 133 analyzes the linking data 132 (step S60) and determines whether the measurement result reaches a target value (step S61). When the measurement result reaches the target value (Yes in step S61), the member C 133 ends the process (step S62). When the measurement result does not reach the target value (No in step S61), the member C 133 generates an etching recipe after reexamination and allows the etching device 127 to execute the etching recipe.

(Flow of Operations on WEB Application)

A flow of operations on a WEB application for linking the data will be described in more detail with reference to FIG. 7. FIG. 7 is a diagram illustrating a GUI of the WEB application for performing the data linking. A GUI 30 is generated by the application server 109 or the WEB server 110 and displayed on the user computer 114 or the user mobile terminal computer 115.

First, in order to search for the etching device, the user presses a "device search" button 31 and selects "etcher" and "chamber". Herein, an etcher 1 and a chamber 2 are selected.

Next, by pressing a "recipe search" button 32, the etching recipe is selected. Herein, a recipe 1 is selected.

Next, in order to search the measurement result, a "measurement result search" button 33 is pressed. Herein, a measurement 2 is selected.

Finally, in order to clarify the linking data, the naming of the linking data is performed. By pressing a "linking data search" button 34, a combination of the recipe and the measurement result is selected. Herein, the recipe 1 and the measurement 2 are selected. The name inputting is performed to input the name of the selected data. Herein, the naming as the linking 1 is performed. A graphic design, a search method, and an input method are not limited to these methods.

In addition, although the search and the selection are performed manually herein, the search and the selection may be replaced by automatically reading the barcode attached to the wafer or the wafer cassette or by automatically reading a sample ID, a recipe ID, or a lot ID. The result observed in the observed semiconductor manufacturing device is integrated with the recipe ID, the sample ID, or the lot ID. Herein, the recipe ID is used as a key because the recipe is linked to the result, but the recipe ID may be replaced with the lot ID or the sample ID, and merged with data indicating the result of the device.

(Remote Monitoring)

Remote monitoring will be described again with reference to FIG. 1. The remote monitoring computer 116 monitors logs and alarms of the semiconductor device manufacturing system 1 including the data of each device in the device group and the platform 117 to detect a system abnormality and a device failure.

A detection process will be described by using FIG. 8 as well. FIG. 8 is a diagram schematically illustrating a process of abnormality detection or failure detection. The remote monitoring computer 116 collects logs indicating the operation of each device in the device group and alarms generated from the devices. The logs and the alarms are stored in the shared folder of the relay PC 105 and stored in the database server 106 by the gateway PC 108. The remote monitoring computer 116 collects logs and alarms from the gateway PC 108 directly or via the WEB server 110.

Specifically, each device in the device group generates log data (step S80). The log data is stored in the shared folder of the relay PC 105 and stored in the database server 106 by the gateway PC 108. The log data is uploaded to the platform 117 (step S81).

Subsequently, the remote monitoring computer 116 functions as a remote center. Specifically, the remote monitoring computer 116 acquires the log data (step S82). The remote monitoring computer 116 executes an analysis program, for example, compares the log data with a reference range during a normal operation, and monitors whether there is any deviation in the behavior of the device (step S83). Further, for example, the remote monitoring computer 116 performs the data analysis to grasp a relationship between the log data and a product quality or a yield (step S84). When no abnormality is detected as a result of the monitoring and the data analysis (No in step S85), the remote monitoring computer 116 acquires the log data again and performs the monitoring and the data analysis. On the other hand, when the abnormality is detected (Yes in step S85), the remote monitoring computer 116 issues the alarm (step S86).

The user accesses the semiconductor device manufacturing system 1 via the platform 117 (step S87). The user checks the alarm (step S88) and takes appropriate coping (step S89). For example, when the alarm for replacing the device component is checked, the corresponding component is replaced. It is noted that, in response to the issued alarm, the device group may automatically cope with the abnormality. Further, herein, although the user or the device is notified of the alarm, the robot using AI may be used, and a means is not limited.

The display of the alarms on the platform 117 will be described in more detail with reference to FIG. 9. FIG. 9 is a diagram illustrating a GUI of a WEB application for setting the alarm. A GUI 40 is generated by the application server 109 or the WEB server 110 and displayed on the user computer 114 or the user mobile terminal computer 115.

First, in order to select data to be alarmed, the user presses a data search button 41 and selects the data to be alarmed. Herein, data 1 is selected. In order to set a threshold value of the data 1 in advance, the user enters the threshold value in a threshold value input form 42, selects whether to issue the alarm when it is larger than the threshold value or issue the alarm when it is smaller than the threshold value, and enters the alarm display setting. Herein, when the power is larger than 300 W, it is set to issue an alarm for "power abnormality" shown in an alarm display setting field 43.

Furthermore, by setting the coping when the alarm is issued, the user or the device can immediately cope with the alarm. In a during-alarm coping setting window 44, an alarm content is selected, and a coping content and a coping reason are set. Herein, the user presses an alarm content search button 45 to search the alarm content and selects "power abnormality".

Subsequently, when the alarm for "power abnormality" occurs, a coping method is input into a coping form 46, and the coping reason is input into a coping reason form 47, respectively. As coping in the case of "power abnormality", the coping is to "prompt selection of an appropriate power mode due to use in an excessive power mode". In addition, the coping reason is that "by using the maximum rated power, and by using the power appropriate for the purpose, power consumption can be reduced". The coping method and the coping reason are displayed on the user computer 114 or the user mobile terminal computer 115 at the same time as the alarm.

In this way, by using the built-in program of the remote monitoring computer 116, the coping method and coping reason for the alarm content can be remotely generated, and herein, the customer can be recommended to the coping to reduce power consumption. It is noted that, although herein, the coping method is presented to the user, the program corresponding to the coping method for each device group can be set. In the case of the robot using AI, the coping method for the alarm may be set in advance, and the coping method may be determined according to the alarm.

Although the gateway PC 108 uploads the data stored in the shared folder of the relay PC 105 in step S81, the method is not limited thereto. The batch processing method may be applied to the method of conveying data output from each of the semiconductor manufacturing devices. Furthermore, a conveying capacity per unit time of the data output from each of the semiconductor manufacturing devices may be limited. In addition, for example, the relay PC 105 has the data folder for temporarily storing the output data, and the gateway PC 108 does not transfer the conveyed data output from each of the semiconductor devices, but the added or changed data output from each of the semiconductor manufacturing devices may be conveyed via the Internet. By doing so, only the updated portion of the output data can be conveyed to the external network, so that constant monitoring can be efficiently performed while suppressing a data amount during the uploading.

(Functions and Effects)

The users can handle data of the semiconductor manufacturing device and the semiconductor inspection/measurement device via the external network or the internal network, and can handle only the data extensions registered in the device master MA, and by preventing unknown data leakage from the device group including the semiconductor manufacturing device, the predetermined data on each device group can be handled without a security risk. As described above, according to the present disclosure, it is possible to deal with data output from the device with a high security risk, such as a device group including a semiconductor manufacturing device, and thus, it is possible to handle a large amount of data.

Second Embodiment

A second embodiment of the present invention will be described with reference to FIG. 10. FIG. 10 is a diagram illustrating a configuration of a semiconductor device manufacturing system using a platform 117*a* and a device group including a semiconductor manufacturing device. The difference from the first embodiment is that the platform 117*a* is installed within the internal network. The database server 106 is disposed on the platform 117*a* and is connected to the gateway PC 108 via a network different from the Internet 113.

For example, the first embodiment is the case where the server groups 106 and 109 to 111 are configured by a cloud service, and the second embodiment is the case where the server groups 106 and 109 to 111 are configured on-premises. By configuring the server groups 106 and 109 to 111 on-premises, it is possible to further reduce the risk of external leakage of data related to the semiconductor manufacturing. By also providing the database server 106 in the internal network, the data in the device master MA and the data on the device group are no longer conveyed to the external network, so the risk of data leakage to the external network can be further reduced.

In the above embodiments, the term "PC" is used to describe the device PCs 101 to 104 and the relay PC 105, but the "PC" is not limited to a PC terminal. The "PC" of the present disclosure may not be the PC terminal, but may also be a virtual area, a server, or a mobile terminal. Further, the "computer" indicates an example of the information communication device, and the present disclosure is not limited thereto. Furthermore, although the communication methods have been described by using the SMB communication and the HTTP communication, the communication methods are not limited thereto. In addition to these communication methods, the present disclosure is also applicable to FTP communication, NFS communication, and the like.

Furthermore, although the above-described embodiments have been described by using the etching device as an example of the semiconductor manufacturing device, the present disclosure is also applicable to other manufacturing devices such as a plasma CVD device, an ashing device, a surface modifying device, and the like.

Other Aspects

The present disclosure also includes the following aspects.

Aspect 1

A semiconductor device manufacturing system including a platform connected to a semiconductor manufacturing device via a network, the semiconductor device manufacturing system further including:

a database server in which a device ID assigned to each of the semiconductor manufacturing devices and extension of data output from each of the semiconductor manufacturing devices are stored as a device master;

a conversion connection device in which the data is acquired by accessing the device master based on authentication information of the network or authentication information of the platform; and a path setting device in which spontaneous data output from the semiconductor manufacturing device is blocked.

(Aspect 2)

The semiconductor device manufacturing system according to aspect 1, in which the database server is disposed on the platform, and is connected to the conversion connection device via the Internet.

(Aspect 3)

The semiconducor device manufacturing system according to aspect 1 or 2, in which the database server is disposed on the platform, and is connected to the conversion connection device via a network different from the Internet.

(Aspect 4)

The semiconductor device manufacturing system according to any one of aspects 1 to 3, in which the data output from each of the semiconductor manufacturing devices is stored in the database server.

(Aspect 5)

The semiconductor device manufacturing system according to any one of aspects 1 to 4, in which the platform includes an application server and a GPU server, and the data output from each of the semiconductor manufacturing devices is downloaded by the application Server or the GPU server.

(Aspect 6)

The semiconductor device manufacturing system according to any one of aspects 1 to 5, in which the platform includes an application server, a GPU server, and a WEB server, and the application server or the GPU server is connected to the WEB server via a communication means.

(Aspect 7)

The semiconductor device manufacturing system according to any one of aspects 1 to 6, in which the platform is connected to a user computer and a user mobile terminal computer via a communication means.

(Aspect 8)

The semiconductor device manufacturing system according to any one of aspects 1 to 7, in which the output from each of the semiconductor manufacturing devices is divided into a plurality of data chunks, and each of the divided data chunks is conveyed in parallel.

(Aspect 9)

The semiconductor device manufacturing system according to any one of aspects 1 to 8, in which the data chunk in which a transfer error occurs is re-conveyed.

(Aspect 10

The semiconductor device manufacturing system according to any one of aspects 1 to 9, in which the data chunks are integrated into one data file, and a data file during transmission and a data file after completion of transmission are compared, and the data file during transmission and the data file after completion of transmission are verified.

(Aspect 11)

The Semiconductor device manufacturing system according to any one of aspects 1 to 10, in which by the conversion connection device, conveyed data output from each of the semiconductor manufacturing devices is not transferred, and added or changed data output from each of the semiconductor manufacturing devices is conveyed via the Internet.

(Aspect 12)

The semiconductor device manufacturing system according to any one of aspects 1 to 11, in which a result observed in the observed semiconductor manufacturing device is integrated with a recipe ID, a sample ID, or a lot ID.

(Aspect 13)

The semiconductor device manufacturing system according to any one of aspects 1 to 12, in which a conveying capacity per unit time of the data output from each of the semiconductor manufacturing devices is limited.

(Aspect 14)

The semiconductor device manufacturing system according to any one of aspects 1 to 13, in which a conveying method of the data output from each of the semiconductor manufacturing devices is a batch processing method.

REFERENCE SIGNS LIST

1: semiconductor device manufacturing system
101: semiconductor manufacturing device PC
102: semiconductor inspection device PC
103: semiconductor parsing device PC
104: semiconductor analysis device PC
105: relay PC
106: database server
108: gateway PC
109: application server
110: WEB server
111: GPU server
113: Internet
114: user computer
115: user mobile terminal computer
116: remote monitoring computer
117, 117*a*: platform
118: data path setting PC
120: local program server
121: member A
122: member B
123: wafer
124: etching recipe
125: processing recipe
126: measurement recipe
127: etching device
128: measurement device
129: measurement result
130: set data
131: linking data
132: linking data of recipes and results
133: Member C
134: etching recipe after reexamination

The invention claimed is:

1. A semiconductor device manufacturing system comprising a platform connected to a semiconductor manufacturing device via a network, the semiconductor device manufacturing system further comprising:

a database server in which a device ID assigned to each of the semiconductor manufacturing devices and extension of data output from each of the semiconductor manufacturing devices are stored as a device master;

a conversion connection device in which the data is acquired by accessing the device master based on authentication information of the network or authentication information of the platform; and a path setting device in which spontaneous data output from the semiconductor manufacturing device is blocked.

2. The semiconductor device manufacturing system according to claim 1, wherein the database server is disposed on the platform and is connected to the conversion connection device via the Internet.

3. The semiconductor device manufacturing system according to claim 1, wherein the database server is disposed on the platform and is connected to the conversion connection device via a network different from the Internet.

4. The semiconductor device manufacturing system according to claim 1, wherein the data output from each of the semiconductor manufacturing devices is stored in the database server.

5. The semiconductor device manufacturing system according to claim 1, wherein the platform includes an application server and a GPU server, and the data output from each of the semiconductor manufacturing devices is downloaded by the application server or the GPU server.

6. The semiconductor device manufacturing system according to claim 1, wherein the platform includes an application server, a GPU server, and a WEB server, and the application server or the GPU server is connected to the WEB server via a communication means.

7. The semiconductor device manufacturing system according to claim 1, wherein the platform is connected to a user computer and a user mobile terminal computer via a communication means.

8. The semiconductor device manufacturing system according to claim 1, wherein the data output from each of the semiconductor manufacturing devices is divided into a plurality of data chunks, and each of the divided data chunks is conveyed in parallel.

9. The semiconductor device manufacturing system according to claim 8, wherein the data chunk in which a transfer error occurs is re-conveyed.

10. The semiconductor device manufacturing system according to claim 8, wherein the data chunks are integrated into one data file, and a data file during transmission and a data file after completion of transmission are compared, and the data file during transmission and the data file after completion of transmission are verified.

11. The semiconductor device manufacturing system according to claim 1, wherein by the conversion connection device, conveyed data output from each of the semiconductor manufacturing devices is not transferred, and added or changed data output from each of the semiconductor manufacturing devices is conveyed via the Internet.

12. The semiconductor device manufacturing system according to claim 1, wherein a result observed in the observed semiconductor manufacturing device is integrated with a recipe ID, a sample ID, or a lot ID.

13. The semiconductor device manufacturing system according to claim 1, wherein a conveying capacity per unit time of the data output from each of the semiconductor manufacturing devices is limited.

14. The semiconductor device manufacturing system according to claim 1, wherein a conveying method of the data output from each of the semiconductor manufacturing devices is a batch processing method.

* * * * *